(12) United States Patent
Michielin et al.

(10) Patent No.: US 8,178,050 B2
(45) Date of Patent: May 15, 2012

(54) PROCESS FOR FEEDING A CATALYST IN A POLYMERIZATION REACTOR

(75) Inventors: Luciano Michielin, Mantova (IT); Olga Pizzutti, legal representative, Mantova (IT); Pier Luigi Di Federico, Ferrara (IT); Luciano Di Nardo, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 105 days.

(21) Appl. No.: 12/451,802

(22) PCT Filed: May 22, 2008

(86) PCT No.: PCT/EP2008/056339
§ 371 (c)(1),
(2), (4) Date: May 7, 2010

(87) PCT Pub. No.: WO2008/145601
PCT Pub. Date: Dec. 4, 2008

(65) Prior Publication Data
US 2010/0247250 A1    Sep. 30, 2010

Related U.S. Application Data

(60) Provisional application No. 60/933,076, filed on Jun. 4, 2007.

(30) Foreign Application Priority Data

Jun. 1, 2007 (EP) .................................. 07109399

(51) Int. Cl.
| | |
|---|---|
| *B01J 19/00* | (2006.01) |
| *B01J 8/08* | (2006.01) |
| *B01J 19/30* | (2006.01) |
| *B65G 53/12* | (2006.01) |
| *B65G 53/36* | (2006.01) |
| *B65G 53/08* | (2006.01) |
| *B65G 53/46* | (2006.01) |

(52) U.S. Cl. ........ 422/131; 422/232; 422/310; 406/146; 406/124; 406/52; 406/131

(58) Field of Classification Search .................. 406/146, 406/124, 52, 131; 422/131, 232, 310
See application file for complete search history.

(56) References Cited

U.S. PATENT DOCUMENTS

3,139,996 A * 7/1964 Welty ............................ 198/723
* cited by examiner

*Primary Examiner* — William Cheung
(74) *Attorney, Agent, or Firm* — Dilworth IP LLC (57) ABSTRACT

A process for introducing a catalyst powder into a polymerization reactor comprising:
a) metering the catalyst powder by means of a rotary valve comprising a stator, a rotor and sealing means arranged between said stator and said rotor;
b) transferring a metered amount of catalyst powder from said rotary valve to a polymerization reactor;
the process further comprising the steps of:
c) feeding a flushing compound in one or more internal conduits arranged in the rotor of said rotary valve;
d) flushing the catalyst powder away from said sealing means.

11 Claims, 4 Drawing Sheets

FIG.1

SECT."A-A"
FIG.2

PROCESS FOR FEEDING A CATALYST IN A POLYMERIZATION REACTOR

This application is the U.S. national phase of International Application PCT/EP2008/056339, filed May 22, 2008, claiming priority to European Application 07109399.1 filed Jun. 1, 2007 and the benefit under 35 U.S.C. 119(e) of U.S. Provisional Application No. 60/933,076, filed Jun. 4, 2007; the disclosures of International Application PCT/EP2008/056339, European Application 07109399.1 and U.S. Provisional Application No. 60/933,076, each as filed, are incorporated herein by reference.

The present invention relates to a process for the olefin polymerization, and more specifically a process for feeding a catalyst powder in an olefin polymerization reactor. In particular, the invention relates to a process for dosing and introducing a powder of a catalytic component, preferably a chromium-based catalyst, into a polymerization reactor by means of a metering rotary valve of a peculiar design.

Chromium-based polymerization catalysts, also denominated as Phillips catalysts, have been successfully used for decades in the production of ethylene (co)polymers. Phillips catalysts are generally prepared by contacting a chromium compound with an inorganic support, and subsequently calcinating said support at a temperature from 350 to 950° C. Aluminum oxide, aluminum phosphate or silica can be used as the inorganic support, which may be impregnated with a chromium-containing solution, such as chromium (III) nitrate or chromium(III)acetate in water or methanol. Afterwards, the solvent is evaporated and the impregnated support is activated under oxidizing conditions, for example in an oxygen-containing atmosphere, at 400 to 1000° C. to generate chromium (VI) species: this calcination step converts chromium having a valence lower than 6 in hexavalent chromium Cr(VI). Therefore, Phillips catalysts contain a high amount of chromium in the hexavalent state: unfortunately, chromium (VI) has been proven highly toxic, and some Cr(VI)-containing wastes are considered to be carcinogens. Moreover, before the disposal of Cr(VI)-containing wastes, it is mandatory to convert the Cr(VI) species to non-toxic chromium species at a lower valence (usually, trivalent or divalent species).

Due to the above reasons, chromium-based catalyst powders have to be managed with a high caution, especially in the industrial steps relative to dosing and feeding of the catalyst powder into the polymerization reactor, with the target of ensuring a high level of safety for all the operators involved in the regular running of a polymerization plant and its maintenance.

It is well known in the art the use of rotary valves for dosing and delivering an appropriate amount of a catalyst powder to a polymerization reactor. Many different types of rotary valves and metering apparatuses have been described in patents and literature.

U.S. Pat. No. 4,764,056 discloses a discontinuous metering apparatus for introducing a free-flowing powdered substance in a controlled manner into a space under pressure, such as a polymerization reactor. This metering apparatus comprises a shaft, which can be rotated alternatively by 180°, having two cavities which are located on opposite sides and take up the catalyst powder on the side facing the catalyst reservoir unit and, after rotation, release it on the side facing an end unit, arranged flush with the wall of the polymerization reactor. The end unit, which receives the catalyst to be metered, is a cylindrical cavity, nozzle-shaped toward the reaction space and sealed by means of sealing rings and a gland. The end unit comprises a spindle which is arranged concentrically with respect to cylindrical cavity and is capable of making stroke-like movements. An amount of catalyst powder corresponding to the volume of the depression and the rotational frequency of the shaft is metered into the reactor by means of the alternate movement of said spindle and by means of a pressurized inert gas.

EP 157584 describes a device and a process for introducing a catalytically active powder into a fluidized bed reactor. This device comprises a storage enclosure adapted to feed the catalyst powder to a metering device, the metering device being capable of communicating sequentially with said storage enclosure and with an intermediate chamber, arranged upstream the fluidized bed reactor. The intermediate chamber is placed below the metering device to receive directly the powder delivered by the latter. The metering device is preferably gas-tight under the pressure existing upstream and downstream, and permits a periodic delivery of a metered volume of catalyst powder into the intermediate chamber. The metering device is of the rotary type and comprises at least one cavity which can communicate alternatively with the storage enclosure and the intermediate chamber, this cavity having the shape of a truncated cone with a diameter of its base comprised between 0.5 and 10 times its height.

EP 628 343 relates to a process for introducing a solid into a reactor with the aid of a feed enclosure connected to the reactor through an injection pipe. The solid is introduced into the feed enclosure, wherein most thereof settles at rest, and successively a gas is introduced tangentially to the wall of said feed enclosure, so as to suspend the solid forming a suspension of solid entrained by the gas into the injection pipe. The rotary valve used to introduce the solid into the feed enclosure comprises a cavity, which can communicate alternatively with the lowest part of the solid storage and with the top of the feed enclosure. Said rotary valve may be also the one described in EP 157584.

The rotary valves disclosed in the above prior art documents comprise a sealing system having the function of maintaining, during the dosage operation, the catalyst powder in an ambient at the desired pressure, and also of preventing the catalyst powder from diffusing outside the rotary valve.

When an olefin polymerization process is carried out in the presence of a Cr-based catalyst system, high values of pressure, ranging from 30 to 45 bar, have to be maintained in all the equipments aimed to provide the metering of the catalyst powder. Thus, the sealing means of the metering valve must guarantee said values of pressure inside the valve. However, the sealing rings of the valve are subjected to wear and consumption caused by the periodic rotation of the rotor and its friction against the stator, so that the sealing efficiency decreases along the time and little amounts of granular powder can pass through the sealing rings, thus diffusing outside the valve in the free atmosphere. This occurrence is highly dangerous in case of a chromium-based catalyst powder, since the Cr(VI) species can contaminate the operators working in the polymerization plant.

It would be largely desirable, when feeding a chromium-based catalyst to a polymerization reactor, to make use of a rotary valve provided with means capable of picking up the catalyst powder eventually passing through the sealing rings, thus transferring the catalyst powder far away from the deleterious contact with the operators.

It is therefore a first object of the present invention a process for introducing a catalyst powder into a polymerization reactor comprising:
a) metering the catalyst powder by means of a rotary valve comprising a stator, a rotor and sealing means arranged between said stator and said rotor;

b) transferring a metered amount of catalyst powder from said rotary valve to a polymerization reactor;
the process further comprising the steps of:
c) feeding a flushing compound in one or more internal conduits arranged in the rotor of said rotary valve;
d) flushing the catalyst powder away from said sealing means.

The process of the present invention can be successfully exploited for introducing a catalyst powder into a polymerization reactor operated both in a gaseous and a liquid-phase. By means of the rotary valve herewith described, a potentially dangerous powder of catalyst, such as a chromium-based polymerization catalyst, may be accurately and reliably metered into the polymerization reactor, without any risk for the health of the plant operators.

However, the process of the invention may be also exploited for the metering of a large variety of highly active polymerization catalysts, the invention being not limited to the use of Phillips catalysts. All the known polymerization catalysts suitable for an olefin polymerization process may be taken into account, the only prerequisite to be satisfied being to feed the catalyst in a form of a powder. Said catalysts are preferably used in a supported form, for example on support materials, such as inorganic oxides (e.g. magnesium oxide or silica), magnesium chloride, magnesium ethoxide.

The catalyst powder may be also a catalyst containing a transition metal belonging to group IV, V or VI of the Periodic Classification of the elements, such as titanium, vanadium, zirconium or hafnium. It can be in particular a catalyst of Ziegler-Natta type containing the above mentioned transition metals in a halogenated form. Preferably, the Ziegler-Natta solid component comprises a titanium tetrachloride compound supported on a magnesium chloride. The solid catalyst can be also a hybrid catalyst comprising at least two different polymerization catalysts, the first component being a polymerization catalyst based on a monocyclopentadienyl complex of a metal of groups 4-6 of the Periodic Table, the second component being a polymerization catalyst based on iron component having a tridentate ligand.

The catalyst powder is preferably a Phillips catalyst based on a chromium oxide supported on a refractory oxide, such as silica, and activated by a heat treatment. These catalysts consist of chromium (VI) trioxide, chemically fixed on silica gel. These catalysts are produced under oxidizing conditions by heating the silica gels that have been doped with chromium (III) salts (precursor or precatalyst). During this heat treatment, the chromium(III) oxidizes to chromium(VI), the chromium(VI) is fixed and the silica gel hydroxyl group is eliminated as water.

The particular design of the rotary valve according to the invention allows to achieve a continuous removal of the catalyst powder eventually passing through the sealing means of the valve. In particular, a flushing inert compound flowing inside the rotary valve picks up the powder and conveys it to a collection system placed outside the rotary valve. From said collection system the powder can be easily transferred to a successive treatment step, where the chromium-based catalyst is made harmless by reducing the Cr(VI) species to non-toxic chromium species at a lower valence (usually, trivalent or divalent species).

According to present invention, the flushing compound flowing inside the rotary valve may be any compound, which is inert towards the catalyst powder. It may be fed to the rotary valve in a gaseous or liquid state. Anyway, the flushing compound is preferably selected in the group of those inert compounds more commonly used in an olefin polymerization reactor, that is to say nitrogen and $C_2$-$C_8$ alkanes. The flushing compound is preferably selected from nitrogen, propane, isopentane, hexane, cyclohexane.

The feeding of the flushing compound dragging away the catalyst powder allows to make use of the rotary valve efficiently for a long time without the need of a periodical disassembly of the valve itself: this represents a great advantage with respect to the prior art embodiments for a metering rotary valve, wherein the leakage of chromium catalyst beyond the sealing means periodically requires a complete disassembly of the rotary valve in order to clean accurately its internal parts. According to the embodiment of the invention, the internal parts of the rotary valve may be kept cleaned for a long time without a periodical disassembly of the valve.

In the process according to the present invention, the above described steps b) and d) are simultaneously operated. Moreover, the above defined step c) and step d) are preferably operated in a continuous way.

The structural arrangement of the rotary valve comprises a rotor, a stator, and sealing means arranged between said stator and said rotor. The rotor of the valve comprises:
  one or more recesses for collecting and metering the catalyst powder;
  one or more internal conduits arranged along its axial direction, said internal conduits being in communication with chambers situated in proximity of the sealing means of the valve.

Depending on the type of catalyst, the amount of metered catalyst powder exiting from the rotary valve may be optionally transferred to a catalyst activation step, before the successive feeding to the polymerization reactor.

In step b) the metered amount of catalyst powder is continuously transferred to the polymerization reactor by means of a gaseous or liquid carrier. Said carrier is preferably nitrogen or gaseous propane when a Phillips catalyst powder is transferred, while it is preferably propane when a Ziegler-Natta catalyst powder is transferred to the polymerization reactor.

BRIEF DESCRIPTION OF THE DRAWINGS

The present invention will be, thereafter, described in more details with reference to the enclosed drawings, which are illustrative and non-limitative of the scope of the invention.

Figure 1:
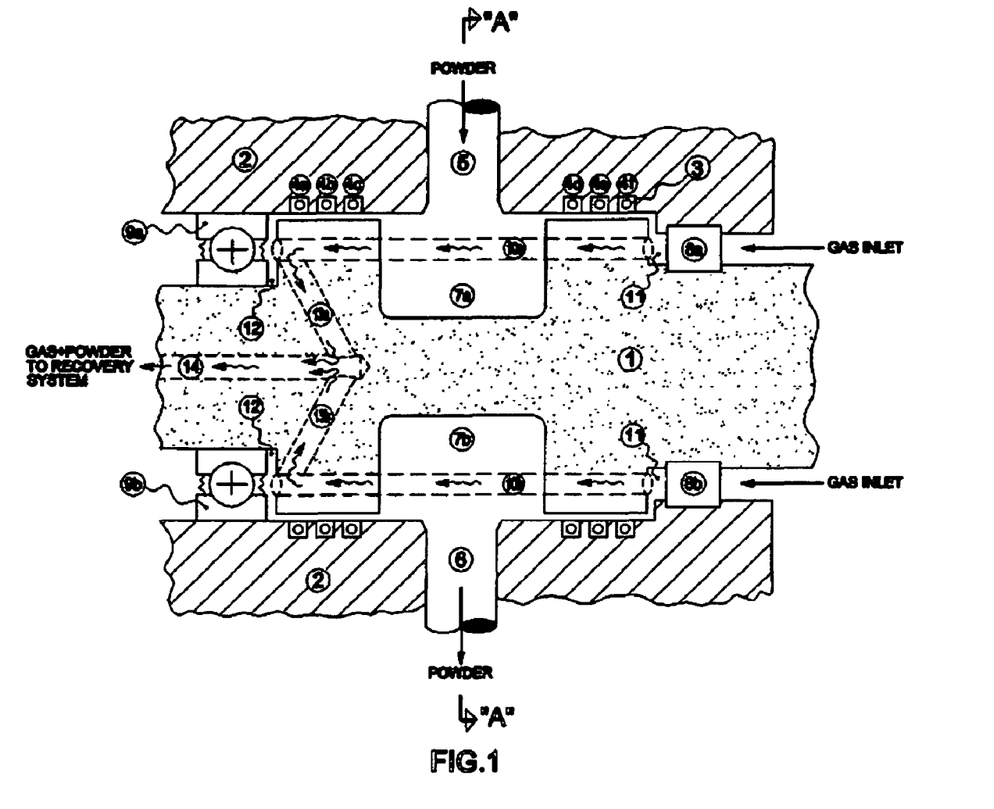
FIG. 1 is a schematic view of the rotary valve of present invention, taken along a section parallel to the rotor axes.

FIG. 1 shows the metering of a chromium-based catalyst by means of a rotary valve according to the invention, which is able to flush away the catalyst powder eventually passing through the sealing means.

The rotary valve comprises, as constituent elements, a rotor 1 having a substantially cylindrical shape, which can be rotated around its axes, a stator 2 surrounding said rotor 1, sealing means 3 comprising a sequence of sealing rings 4 sandwiched between said rotor 1 and said stator 2.

The upper portion of the stator 2 comprises a first channel 5 able to receive the solid catalyst coming from a catalyst storage tank, such as a catalyst drum or a catalyst hopper. Likewise, the bottom portion of the stator 2 comprises a second channel 6, able to deliver the metered amount of catalyst powder to the downstream equipment, for instance a catalyst activation vessel or a polymerization reactor.

In the embodiment of FIG. 1 the rotor 1 is provided with two recesses 7a and 7b, symmetrically arranged with respect to the rotor axes. The rotor 1 is subjected, with an established frequency, to a rotation equal to an angle of 180°, so that recesses 7a and 7b are mutually located in correspondence of channel 5 or channel 6: as a consequence, when the recess 7a is filled with the catalyst powder coming from the channel 5, the other recess 7b is emptied, due to fall of powder by gravity into the channel 6.

The amount of catalyst powder which is metered and transferred in the time unit depends on the size of the recesses 7a and 7b, and above all, on the rotational frequency of the rotor 1.

The sealing means 3 comprise a double sequence of sealing rings 4 to isolate the external ambient from the operative conditions existing inside the valve. In FIG. 1 the sealing rings 4a, 4b, 4c are arranged on the left side, while the sealing means 4d, 4e, 4f are arranged on the right side with respect to recesses 7a and 7b.

Each sealing ring 4a, 4b, 4c, 4d, 4e, 4f is a low friction lubroring filled with PTFE (polytetrafluoroethylene).

The rotary valve also comprises bearing 8a and 8b interfacing rotor 1 and stator 2 on one side of the valve, and sealing bearing 9a and 9b interfacing rotor 1 and stator 2 on the other side of the valve.

The rotor 1 is further provided with two internal conduits 10a and 10b, which are oriented along the direction of the rotor axes and run through the length of the rotor 1, as shown in FIG. 1.

Due to the high values of pressure, of about 25-45 bar, existing in the channels 5, 6 and recesses 7a, 7b when metering a polymerization catalyst powder, and also due to the high degree of wear affecting the sealing rings 4 (frequent rotation of rotor 1 and consequent friction against stator 2), little amounts of chromium catalyst can overcome the sealing rings 4 and reach the annular chambers 11 and 12, indicated in FIG. 1.

According to the process of the invention, a flushing inert compound is fed along the internal conduits 10a and 10b of the rotor 1, said internal conduits 10a and 10b being in communication with chambers 11 and 12, placed in proximity of the sealing rings 4. As a consequence, the catalyst powder eventually present in the annular chambers 11 and 12 is picked up by the flow of the flushing compound and flushed away from the annular chambers 11 and 12.

The inlet point of said flushing compound can be placed in correspondence of the bearing 8a, or alternatively, of the bearing 8b: the bearing 8a and 8b are free of sealing, thus allowing the continuous feeding of the flushing compound and its penetration in the annular chamber 11. The catalyst powder picked-up from the flushing compound is removed away from annular chamber 11 and is entrained along the internal conduits 10a and 10b. The outlet of the internal conduits 10a and 10b converges into the annular chamber 12, where the flushing inert compound picks-up the additional catalyst powder, if present therein.

The bearings 9a and 9b are both provided with a sealing device, so that the flushing compound with the entrained powder is forced to enter the channels 13a, 13b inside the rotor 1 and successively flows through the exit channel 14. The picked-up catalyst powder leaves the rotary valve via the exit channel 14 and may be transferred to a collection tank, before a treatment step to make it harmless.

Figure 2:
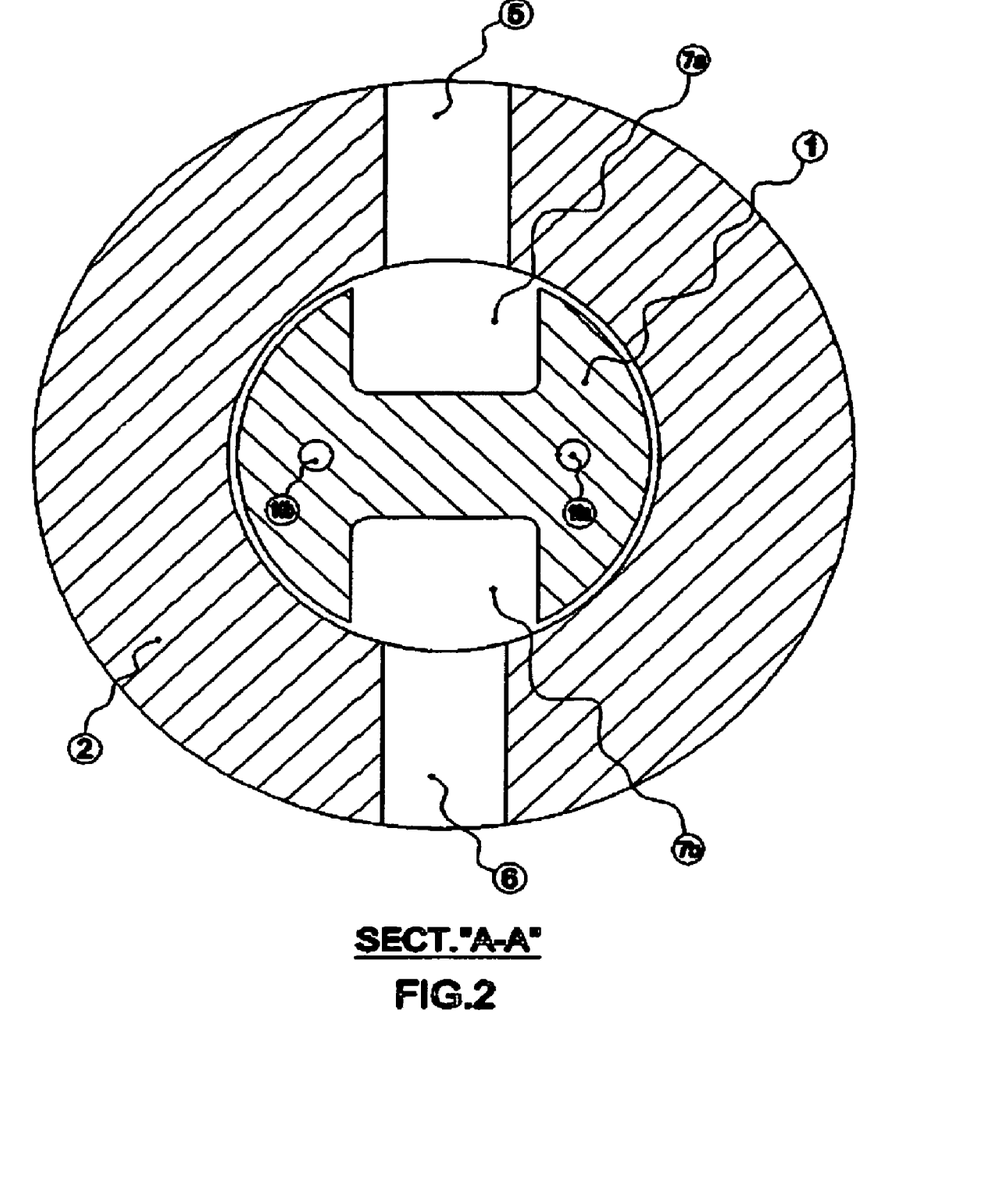
FIG. 2 is a schematic view of the rotary valve of present invention, taken along a section perpendicular to the rotor axes.

FIG. 2 shows the rotary valve of FIG. 1 along a section AA', which is perpendicular to the rotor axes. The rotor 1 rotates inside the housing of the stator 2 and by means of recesses 7a and 7b operates the metering and transfer of the catalyst powder. The channel 5 receives the catalyst powder from a catalyst storage tank, while the channel 6 delivers the metered amount of catalyst powder to the downstream equipment.

As highlighted by FIG. 2, the internal conduits 10a, 10b are preferably arranged in the rotor 1 according to a symmetrical position with respect to recesses 7a and 7b.

Figure 3:
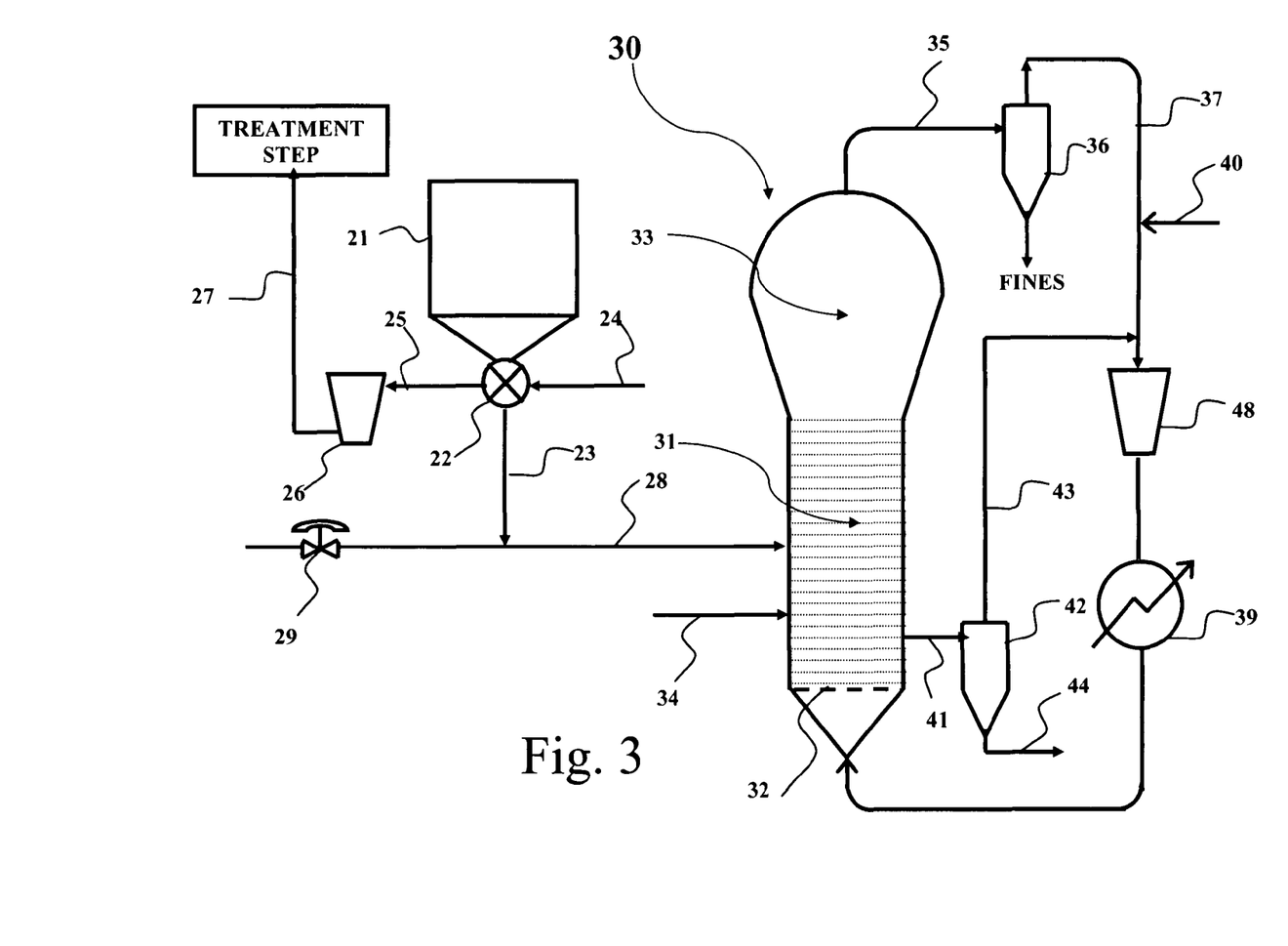
FIG. 3 shows a first embodiment of the process of the invention, where a chromium-based catalyst is metered and introduced into a gas-phase polymerization reactor by means of the rotary valve of FIGS. 1-2.

FIG. 3 shows an embodiment in which a chromium catalyst powder is metered and introduced into a gas-phase polymerization reactor by means of the rotary valve of FIGS. 1-2.

According to FIG. 3 a solid catalyst component consisting of a chromium (VI) trioxide, chemically fixed on silica gel is first metered by means of the rotary valve of present invention and then transferred and introduced into a fluidized bed reactor for the ethylene polymerization.

The solid catalyst component is stored in the form of a powder inside a catalyst hopper 21 under an inert atmosphere: the average diameter of the powder may range from 5 μm to 250 μm. The catalyst may be stored under an inert atmosphere in a form of a dried powder, substantially free from liquid.

The pressure in the hopper 21 is preferably adjusted at high values, ranging from 30 to 45 bar, greater than the pressure existing in the polymerization reactor, in a range of about 15-30 bar, so as to favor the transfer of the catalyst powder into the reactor due to pressure gradient, without incurring in the use of any pump or compressor along the feeding line of the catalyst powder.

According to the embodiment of FIG. 3, a powder of chromium catalyst is continuously fed into the polymerization reactor 30, without any risk for the plant operators to enter in contact with the dangerous catalyst powder.

The rotary valve 22 is placed below the catalyst hopper 21 to receive directly the powder delivered by the latter and operates a periodic metering of a volume of catalyst powder. The two recesses present inside the rotor of the valve 22, described in FIG. 1-2, are capable of communicating sequentially with the bottom part of the catalyst hopper 21 and with the inlet of the transfer line 23.

As described in connection with FIG. 1, the rotary valve 22 comprises a double sequence of sealing rings capable of keeping high value of pressure, as required by the feeding operation, in the channels 5, 6 and in the recesses 7a, 7b. A flushing inert compound is continuously fed via line 24 into the internal conduits of the rotor, and picks up the chromium catalyst powder, eventually passing through the sealing rings. The flushing compound enriched of the catalyst powder is then removed outside the rotary valve 22, successively conveyed via line 25 to the powder collection tank 26. The catalyst powder is successively passed via line 27 from the collection tank 26 to a peculiar treatment step, aimed to make harmless the chromium (VI) species.

The transfer line 23 connects the rotary valve 22 with a line 28 for feeding the catalyst powder to the polymerization reactor. A flow of a gaseous or liquid carrier continuously enters the feeding line 28 via the control valve 29: accordingly, the catalyst powder is continuously conveyed to the fluidized bed reactor 30 by the flow of said gaseous or liquid carrier. The control valve 29 has the function of adjusting the flow rate of the catalyst carrier in the feeding line 28. The catalyst carrier is conveniently selected between those inert compounds more commonly used in an olefin polymerization process, such as nitrogen and $C_2$-$C_8$ alkanes. When using a chromium-based catalyst as the polymerization catalyst, the catalyst carrier of line 28 is preferably selected from nitrogen or gaseous propane.

The fluidized bed reactor 30 for the ethylene polymerization comprises a fluidized bed 31 of growing polymer particles, a fluidization grid 32 and a velocity reduction zone 33. The velocity reduction zone 33 is generally of increased diameter compared to the diameter of the fluidized bed 31 of the reactor. As said, the catalyst powder enters the reactor 30 via line 28, while an aluminum alkyl compound, as the catalyst activator, is fed to the reactor 30 via line 34. In case of an olefin polymerization by means of a Philips catalyst, the activator of line 34 is preferably tri-hexyl-aluminum.

The gaseous stream leaving the top of the velocity reduction zone 33 is transferred via the recycle line 35 to a gas/solid separator 36, such as a cyclone, to remove away the finest particles from the gaseous recycle stream. The gas stream leaving the top of the separator 36 is conveyed via line 37 to a compressor 38 and then to a heat exchanger 39. The recycle line 37 is equipped with a line 40 for feeding ethylene, optional comoners, hydrogen as a molecular weight regulator, and the inert polymerization gases, such as nitrogen or propane.

In case of production of ethylene copolymers, the comonomers are preferably 1-butene and/or 1-hexene.

Passing through the heat exchanger 39, the gaseous stream is cooled and then fed to the bottom of the fluidized bed reactor 30 through the distribution grid 32. In this way the upwardly flowing gas continuously maintains the bed of polymer particles in fluidization conditions.

The produced polymer is discharged from the lower part of the fluidized bed 31 via line 41 and is passed to a solid/gas separator 42, in order to remove most of the gas from the discharged polymer. The gas mixture is fed back to the recycle line 37 via line 43, while the degassed polymer is sent via line 44 to the downstream equipment, such as steaming, drying and extrusion (not shown).

Figure 4:
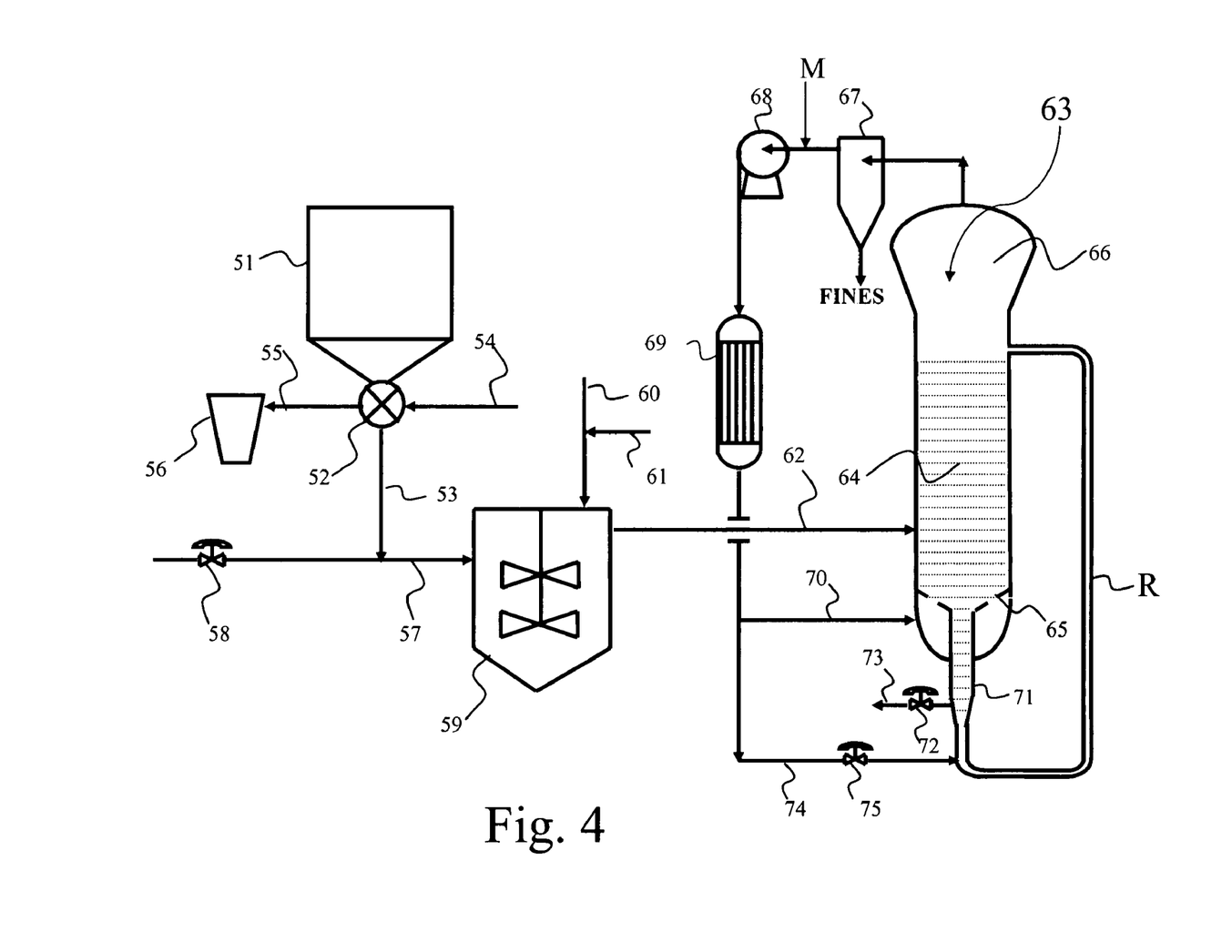
FIG. 4 shows a second embodiment of the process of the invention, where a Ziegler-Natta catalyst powder is metered and introduced into a gas-phase polymerization reactor by means of the rotary valve of FIGS. 1-2.

In the embodiment shown in FIG. 4 a Ziegler-Natta catalyst component is metered by means of the rotary valve 52 of present invention before the feeding to an olefin polymerization reactor. The catalyst component comprises a titanium tetrachloride compound supported on a magnesium chloride.

These catalyst particles are stored in the form of a powder inside the catalyst hopper 51 under an inert atmosphere. The catalyst may be stored in a form of a dried powder, substantially free from liquid.

The rotary valve 52 is placed below the catalyst hopper 51 to receive directly the powder delivered by the latter and operates a periodic delivery of a metered volume of catalyst powder to the transfer line 53. As shown in connection with FIG. 1 a flushing inert compound is continuously fed via line 54 to the internal conduits of the rotary valve 52, and picks up the catalyst powder eventually overcoming the sealing rings of the valve. The flushing compound entraining the catalyst powder is then conveyed outside the rotary valve 52 and is then transferred via line 55 to the powder collection tank 56.

The transfer line 53 connects the rotary valve 52 with a line 57 for feeding the catalyst powder to a catalyst activation vessel 59. A flow of a gaseous or liquid carrier continuously enters line 57 via the control valve 58: accordingly, the catalyst powder is continuously conveyed to the activation vessel 59 by the flow of said gaseous or liquid carrier. Said gaseous or liquid carrier is conveniently selected between those inert compounds more commonly used in an olefin polymerization process, such as nitrogen or $C_2$-$C_8$ alkanes. When metering a Ziegler-Natta catalyst powder the carrier of feeding line 57 is preferably liquid propane.

An organo-aluminum compound, preferably tri-ethyl-aluminum, as the catalyst activator is fed via line 60 to the activation vessel 59. Optionally, an electron donor compound may be fed to the activation vessel 59 via line 61. Once activated, the catalyst particles are hence withdrawn from the vessel 59 and fed via line 62 to a fluidized bed reactor 63.

The fluidized bed reactor 63 is provided with a special loop R for the continuous recirculation of the solid particles inside the reactor: this reactor is described in detail in the Applicant's International Application PCT/EP2006/068935.

The fluidized bed reactor 63 comprises a fluidized bed 64 of polymer, a fluidization grid 65 and a velocity reduction zone 66. The velocity reduction zone 66 is generally of increased diameter compared to the diameter of the fluidized bed portion of the reactor. The polymer bed is kept in a fluidization state by an upwardly flow of gas fed through the fluidization grid 65 placed at the bottom portion of the reactor.

The gas leaving the top of the velocity reduction zone 66 may comprise, besides the unreacted monomers, also inert condensable gases, such as alkanes, as well as inert non-condensable gases, such as nitrogen. The finest polymer particles entrained by the gas are removed in the gas/solid separator 67. Make-up monomers, molecular weight regulators, and optional inert gases are fed into the gas recycle line via line M placed upstream the compressor 68. The recycle gas mixture is compressed by compressor 68, and cooled by the heat exchanger 69. Passing through the heat exchanger 69, the gaseous stream is cooled in order to dissipate the reaction heat and then transferred via line 70 to the bottom of the fluidized bed reactor, below the gas distribution grid 75.

The fluidized bed reactor 63 is provided with a continuous pneumatic recycle of polymer by means of a circulation loop, indicated with reference R, connecting the fluidization grid 65 to a region above the polymer bed 64.

The upper end of a vertical pipe 71 is connected to the fluidization grid 65, while its lower end is connected to the recirculation loop R. The distribution grid 65 has preferably a conical shape in such a way that its downward inclination towards the vertical pipe 71 fosters the entry of the polymer powder into the pipe 71 due to gravity. The inlet of pipe 71 is preferably located in a central position with respect to the fluidization grid 65, as shown in FIG. 1.

A control valve 72 is installed in proximity of the vertical pipe 71 for adjusting the flow rate of polymer discharged from the reactor 63 into the discharge conduit 73. Segmental ball valves or eccentric rotary type valves can be used as the control valve 72. The discharge of polymer is carried out in continuous and the opening of said control valve 72 is adjusted so as to keep constant the level of solid inside the fluidized bed reactor 63. The polymer particles not discharged through the discharge conduit 73 are continuously recycled to the upper region of the reactor running through the circulation loop R.

A "thrust gas" is generally fed via line 74 at the inlet of the circulation loop R, said thrust gas being the gaseous carrier entraining the solid particles along the circulation loop R. The control valve 75 adjusts the flow rate of "thrust gas" entering the circulation loop R. Said thrust gas can advantageously be taken from the gas recycle line of the reactor at a point downstream the compressor 68, or alternatively, downstream the heat exchanger 69.

The operative pressure in the fluidized bed reactor 63 is maintained at conventional values generally comprised between 10 and 30 bar, the temperature being comprised between 50 and 130° C.

It is a second object of the present invention an apparatus for introducing a catalyst powder into a polymerization reactor, the apparatus comprising:

a tank or a hopper for the storage of said catalyst powder;

a metering rotary valve comprising: a stator, a rotor, sealing means arranged between said stator and said rotor, and flushing means for the feeding of a flushing compound inside the rotor of said valve;

transfer means for conveying a metered amount of catalyst powder to said polymerization reactor.

As shown in FIG. 1, the flushing means of the rotary valve comprise two internal conduits 10a and 10b arranged in the rotor 1 along in its axial direction. The internal conduits 10a and 10b are in communication with the annular chambers 11 and 12, situated in proximity of the sealing rings 4.

The sealing means 4 comprise a sequence of low friction lubrorings filled with polytetrafluoroethylene (PTFE).

The process and apparatus for feeding a catalyst powder of the invention is not limited to a polymerization process carried out in a gaseous phase, but it may be successfully applied to the liquid-phase process for the olefin polymerization, such as a solution polymerization. In this case, the flushing compound flowing inside the rotary valve is a liquid compound, which is inert towards the catalyst powder, preferably selected from propane, isopentane, cyclohexane. For instance, in the solution polymerization of propylene the flushing compound is preferably cyclohexane, which is used as the polymerization diluent.

The α-olefins which can be polymerized have formula $CH_2=CHR$, where R is hydrogen or a hydrocarbon radical having 1-12 carbon atoms. Examples of polymers that can be obtained are:

high-density polyethylenes (HDPEs having relative densities higher than 0.940) including ethylene homopolymers and ethylene copolymers with α-olefins having 3 to 12 carbon atoms;

linear polyethylenes of low density (LLDPEs having relative densities lower than 0.940) and of very low density and ultra low density (VLDPEs and ULDPEs having relative densities lower than 0.920 down to 0.880) consisting of ethylene copolymers with one or more α-olefins having 3 to 12 carbon atoms;

elastomeric terpolymers of ethylene and propylene with minor proportions of diene or elastomeric copolymers of ethylene and propylene with a content of units derived from ethylene of between about 30 and 70% by weight;

isotactic polypropylene and crystalline copolymers of propylene and ethylene and/or other α-olefins having a content of units derived from propylene of more than 85% by weight;

isotactic copolymers of propylene and α-olefins, such as 1-butene, with an α-olefin content of up to 30% by weight;

impact-resistant propylene polymers obtained by sequential polymerisation of propylene and mixtures of propylene with ethylene containing up to 30% by weight of ethylene;

atactic polypropylene and amorphous copolymers of propylene and ethylene and/or other α-olefins containing more than 70% by weight of units derived from propylene;

When the catalyst powder used in the process of the invention consists of Phillips catalysts, suitable support materials are inorganic compounds, especially porous oxides such as $SiO_2$, $Al_2O_3$, MgO, $ZrO_2$, $B_2O_3$, CaO, ZnO or mixtures of these oxides.

The support materials preferably exhibit a particle size between 1 and 300 μm, particularly from 30 to 70 μm.

Examples of particularly preferred supports are silica gels and alumosilicate gels, preferably those of the formula $SiO2.aAl_2O_3$, in which a stands for a number ranging from 0 to 2, preferably from 0 to 0.5; these are thus alumosilicates or silicon dioxide. Such products are commercially available, for example as Silica Gel 332 sold by Grace.

Doping of the catalyst support with the active component containing chromium preferably takes place from a solution or, in the case of volatile compounds, from the vapor phase.

Suitable chromium compounds are chromium(VI) oxide, chromium salts such as chromium(III) nitrate and chromium (III) acetate, complex compounds such as chromium(III) acetylacetonate or chromium hexacarbonyl, or alternatively organometallic compounds of chromium such as bis(cyclopentadienyl)chromium(II), organic chromic esters or bis (aren)chromium (0). Cr(III) nitrate is preferably used.

The support is generally loaded by contacting the support material, in a solvent, with a chromium compound, removing the solvent and calcining the catalyst at a temperature of from 400° to 1100° C. The support material can for this purpose be suspended in a solvent or in a solution of the chromium compound.

In addition to the chromiferous active component, other doping substances can be applied to the support system. Examples of suitable such doping substances are compounds of boron, fluorine, aluminum, silicon, phosphorus and titanium.

These doping substances are preferably applied to the support together with the chromium compounds but can alternatively be applied to the support in a separate step before or after the application of chromium.

Examples of solvents suitable for use when doping the support are water, alcohols, ketones, ethers, esters and hydrocarbons, methanol being particularly suitable.

The concentration of the doping solution is generally from 0.1 to 200, preferably from 1 to 50 grams of chromium compound per liter of solvent.

The ratio by weight of chromium compounds to the support during application is generally from 0.001:1 to 200:1, preferably from 0.005:1 to 100:1.

According to an embodiment of the process of the invention, the chromium catalyst is prepared by adding small amounts of MgO and/or ZnO to the inactive precatalyst and subsequently activating this mixture in conventional manner. This measure improves the electrostatic properties of the catalyst.

For activation, the dry pre-catalyst is calcined at temperatures between 400° and 1100° C. C, for example, in a fluidized bed reactor in an oxidizing atmosphere containing oxygen.

Cooling preferably takes place under an inert gas atmosphere in order to prevent adsorption of oxygen. It is also possible to carry out this calcination in the presence of fluorine compounds, such as ammonium hexafluorosilicate, by which means the catalyst surface is modified with fluorine atoms.

Calcination of the pre-stage preferably takes place in a vapor-phase fluidized bed. According to one preferred embodiment, the mixture is first heated to from 200° to 400° C., preferably from 250° to 350° C., with fluidization thereof by pure inert gas (preferably nitrogen), which is subsequently replaced by air, whereupon the mixture is heated to the desired end temperature. The mixture is kept at the end temperature for a period of from 2 to 20 hours and preferably from 5 to 15 hours, after which the flow of gas is switched back to inert gas, and the mixture is cooled.

When the catalyst powder used in the process of the invention consists of a Ziegler-Natta catalyst component, further information about this type of catalyst system is further given.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_nX_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide which is preferably $MgCl_2$.

If a stereospecific polymerization of propylene or higher alpha-olefins is aimed, internal electron donor compounds (ID) can be added in the catalyst preparation: such compounds are generally selected from esters, ethers, amines, and ketones. In particular, the use of compounds belonging to 1,3-diethers, phthalates, benzoates and succinates is preferred.

Further improvements can be obtained by using, in addition to the electron-donor present in the solid component, an external electron-donor (ED) added to the aluminium alkyl co-catalyst component or to the polymerization reactor. These external electron donors can be selected among esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the $C_2$-$C_{20}$ aliphatic ethers and in particular the cyclic ethers preferably having 3-5 carbon atoms, such as tetrahydrofurane (THF), dioxane.

Preferred esters are the alkyl esters of $C_1$-$C_{20}$ aliphatic carboxylic acids and in particular $C_1$-$C_8$ alkyl esters of aliphatic mono carboxylic acids such as ethylacetate, methyl formiate, ethylformiate, methylacetate, propylacetate, i-propylacetate, n-butylacetate, i-butylacetate.

The preferred alkoxysilanes are of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

The following examples will further illustrate the present invention without limiting its scope.

EXAMPLES

Example 1

Preparation of a Supported Chromium Catalyst

The support used was a granular $SiO_2$ support having a surface area (BET) of 320 $m^2/g$ and a pore volume of 1.75 ml/g. Such a support is available commercially from, for example, Grace under the trade name Sylopol 332.

The above granular $SiO_2$ support was contacted with a solution of $Cr(NO_3)_3 9H_2O$ in methanol, and after 1 hour the solvent was removed by distillation under reduced pressure.

The resulting intermediate product contained 0.2% wt of chromium. Said intermediate product was calcined in a vapor-phase fluidized bed. The mixture was first of all heated to 300° C. with fluidization thereof by pure nitrogen, which was subsequently replaced by air, whereupon the mixture was heated until the desired end temperature of 700° C. had been reached. The mixture was kept at the end temperature over a period of 10 hours, after which the gas was switched back to nitrogen and the mixture cooled.

A catalyst powder composed of particles having a mean diameter by mass of 85 μm was obtained.

Metering and Feeding of Catalyst Powder

The metering and feeding of the obtained chromium catalyst powder is carried out by means of the embodiment shown in FIG. 3.

The chromium catalyst is stored in a hopper 21, as a dry powder, kept at a pressure of 35 bar under a nitrogen atmosphere.

As described in connection with FIG. 1, the two recesses 7a and 7b, located inside the rotor 1 of the valve, are capable of communicating sequentially with the bottom of hopper 21 and with the inlet of transfer line 23, so that rotary valve 22 receives the catalyst powder coming from hopper 21 and operates a periodic metering and transfer of a volume of catalyst powder.

Each rotation of 180° of the rotor 1 of valve 22 allows to have the metering and transfer of 25 grams of the above indicated catalyst powder. Simultaneously, during said rotation of the rotor, 100 grams of nitrogen as the flushing compound of present invention, are fed via line 24 to the internal conduits 10a, 10b of the rotor 1. As explained in connection with FIG. 1, said flushing compound picks up the chromium catalyst powder, which eventually passes through the sealing rings of the rotary valve. Said flow of nitrogen, thus enriched of catalyst powder, is transferred outside the rotary valve 22 via line 25 to the powder collection tank 26. Successively, the catalyst powder is conveyed to a treatment step aimed to make harmless the chromium (VI) species.

The catalyst metered by rotary valve 22 and falling down by gravity from recess 7b flows along line 23 and enters line 28, which is the feeding line of the catalyst to the polymerization reactor. A second flow of nitrogen, acting as a catalyst carrier, in an amount of 100 Kg/h enters the feeding line 28 via the control valve 29, which has the function of suitably adjusting the flow rate of nitrogen to feeding line 28. Accordingly, said pneumatic transport involved by the nitrogen flow feeds the desired amount of catalyst powder to the fluidized bed reactor 30.

Gas-Phase Polymerization

The fluidized bed reactor 30 of FIG. 3 is used to carry out the preparation of polyethylene. The polymerization temperature is 112° C. with a pressure of 21 bar.

Tri-hexyl-aluminum, as the catalyst activator, is fed to reactor 30 via line 34.

The reaction gas mixture is composed of (% vol.): 56% ethylene, 0.23% 1-hexene, 2% hexane, 41.77% nitrogen.

The produced polyethylene is discharged from the lower part of the fluidized bed reactor 30 via line 41 and is passed to a solid/gas separator 42, in order to remove most of the gases from the discharged polymer. The degassed polymer is then sent via line 44 to the downstream equipment, such as steaming, drying and extrusion.

The use of a rotary valve according to the present invention makes possible to feed a Cr catalyst powder to a polymerization reactor with a high level of security for the plant operators, due to the presence of the flushing compound flowing inside the internal conduits of the rotary valve.

Example 2

The preparation of a linear low density polyethylene (LLDPE) using 1-butene as the comonomer is carried out in a fluidized bed reactor.

A Ziegler-Natta catalyst is used as the polymerization catalyst, comprising a titanium solid catalyst component prepared with the procedure described in WO 04/106388, Example 1, according to which ethylacetate is used as an internal donor compound.

The metering and feeding of the above catalyst powder is carried out by means of the embodiment shown in FIG. 4. The catalyst powder is stored in hopper 51 as a dry powder composed of particles having a mean diameter by mass of 45 µm and kept under a propane atmosphere at a pressure of 35 bar.

As described in connection with FIG. 1, the two recesses 7a and 7b, located inside the rotor 1 of the valve, are capable of communicating sequentially with the bottom of hopper 51 and with the inlet of transfer line 53, so that rotary valve 52 receives the catalyst powder coming from hopper 51 and operates a periodic metering and transfer of a volume of catalyst powder.

Each rotation of 180° of the rotor 1 of valve 52 causes the metering and transfer of 15 grams of the above indicated catalyst powder. Simultaneously, during said rotation of the rotor, 200 grams of propane as the flushing compound of present invention, are fed via line 54 to the internal conduits 10a, 10b of the rotor 1. Said flushing compound picks up the catalyst powder, which eventually passes thorough the sealing rings of the rotary valve. Said flow of propane, thus enriched of catalyst powder, is transferred outside the rotary valve 52 via line 55 to the powder collection tank 56.

The catalyst metered by rotary valve 52 and falling down by gravity from recess 7b flows along line 53 and enters line 57, which is the feeding line of the catalyst powder to catalyst activation vessel 59.

A second flow of propane, acting as a catalyst carrier, in an amount of 10 Kg/h continuously enters the feeding line 57 via the control valve 58, which has the function of suitably adjusting the flow rate of propane in the feeding line 57. Accordingly, said pneumatic transport involved by the propane flow introduces the desired amount of catalyst powder into the catalyst activation vessel 59.

A mixture of triisobutylaluminum (TIBAL) and diethyl aluminum chloride (DEAC) in a weight ratio of 7:1 is used as the catalyst activator: said mixture is fed via line 60 to the activation vessel 59. Moreover, tetrahydrofuran as an external donor is fed to the activation vessel 59 via line 61. The above catalyst components are pre-contacted in propane at a temperature of 50° C. for 60 minutes.

After leaving the activation vessel 59, the activated catalyst powder is introduced into the fluidized bed reactor (reference 63 in FIG. 4) for the copolymerization of ethylene with 1-butene in the presence of propane as a polymerization diluent. Hydrogen is used as the molecular weight regulator.

The ethylene/1-butene polymerization is carried out at a temperature of 80° C. and a pressure of 2.5 MPa. The composition of the gaseous reaction mixture is: 35% mol of ethylene, 16% mol of 1-butene, 7% mol of hydrogen and 42% mol of propane.

The obtained LLDPE copolymer shows a density of 0.920 g/cm$^3$, a melt index MIE of 0.94 g/10 min. The average diameter of the polymer particles is of about 990 µm The use of a rotary valve according to the present invention makes possible to feed in continuous a Ziegler-Natta catalyst powder to a polymerization reactor with a high level of security for the plant operators, due to the presence of the flushing compound flowing inside the internal conduits of the rotary valve.

The invention claimed is:

1. A process for introducing a catalyst powder into a polymerization reactor comprising:
   a) metering the catalyst powder by means of a rotary valve comprising a stator, a rotor and a sealing means comprising a double sequence of sealing rings and arranged between said stator and said rotor;
   b) transferring a metered amount of catalyst powder from said rotary valve to a polymerization reactor;
   c) feeding a flushing compound in at least one internal conduit arranged in the rotor of said rotary valve; and
   d) flushing the catalyst powder away from said sealing means,
   wherein the catalyst powder is selected from:
   (i) a Phillips catalyst based on a chromium oxide supported on a refractory oxide,
   (ii) a Ziegler-Natta catalyst comprising a titanium tetrachloride compound supported on a magnesium chloride, or
   (iii) a catalyst powder comprising at least two different catalyst components, the first component being a polymerization catalyst based on a monocyclopentadienyl complex of a metal of groups 4-6 of the Periodic Table, and the second component being a polymerization catalyst based on an iron component having a tridentate ligand.

2. The process according to claim 1, wherein said catalyst powder is flushed away from said sealing means to a collection system placed outside the rotary valve.

3. The process according to claim 1, wherein said at least one internal conduit arranged in said rotor is in communication with chambers situated in proximity of said sealing means.

4. The process according to claim 1, wherein steps c) and d) are operated in a continuous way.

5. The process according to claim 1, wherein the flushing compound of step c) is selected from nitrogen, propane, isopentane, hexane, or cyclohexane.

6. The process according to claim 1, wherein in step b) said metered amount of catalyst powder is transferred to a catalyst activation step before feeding to said polymerization reactor.

7. The process according to claim 1, wherein in step b) the metered amount of catalyst powder is continuously transferred to said polymerization reactor by means of a gaseous or liquid carrier.

8. The process according to claim 7, wherein said carrier is selected from nitrogen and propane.

9. An apparatus for introducing a catalyst powder into a polymerization reactor, the apparatus comprising:
a tank or a hopper for the storage of said catalyst powder;
a metering rotary valve comprising a stator, a rotor, a sealing means comprising a double sequence of sealing rings and arranged between said stator and said rotor, and a flushing means comprising at least one internal conduit arranged in said rotor along in its axial direction for feeding a flushing compound inside the rotor of said valve; and
a transfer means comprising a transfer line for conveying a metered amount of catalyst powder to said polymerization reactor.

10. The apparatus according to claim 9, wherein said at least one internal conduit is in communication with chambers situated in proximity of said sealing means.

11. The apparatus according to claim 9, wherein the rotor of said rotary valve comprises at least one recesses for collecting and metering the catalyst powder.

* * * * *